(12) United States Patent
Koch et al.

(10) Patent No.: US 10,747,857 B2
(45) Date of Patent: *Aug. 18, 2020

(54) EVENT-BASED SECURITY CHALLENGES

(71) Applicant: AT&T Intellectual Property I, L.P., Atlanta, GA (US)

(72) Inventors: Robert Alan Koch, Norcross, GA (US); Robert Bridger, II, Alpharetta, GA (US); James T. Lee, Jr., New Lenox, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,619

(22) Filed: Sep. 21, 2018

(65) Prior Publication Data

US 2019/0026447 A1  Jan. 24, 2019

Related U.S. Application Data

(63) Continuation of application No. 15/082,079, filed on Mar. 28, 2016, now Pat. No. 10,083,284, which is a
(Continued)

(51) Int. Cl.
*G06F 21/31* (2013.01)
*H04L 29/06* (2006.01)

(52) U.S. Cl.
CPC .............. *G06F 21/31* (2013.01); *H04L 63/08* (2013.01); *G06F 2221/2101* (2013.01); *G06F 2221/2103* (2013.01)

(58) Field of Classification Search
CPC .......... G06F 21/00; G06F 21/30; G06F 21/31; G06F 21/313; G06F 2221/00; G06F 2221/21; G06F 2221/2101; G06F 2221/2103; H04L 63/00; H04L 63/08; H04L 63/0846; H04L 63/0884; H04L 63/10; H04L 63/102; H04L 63/12; H04L 63/16; H04L 63/168
See application file for complete search history.

(56) References Cited

U.S. PATENT DOCUMENTS 6,496,936 B1   12/2002   French et al.
8,132,265 B2    3/2012   Wootton et al.
(Continued)

OTHER PUBLICATIONS

Oath Technologies, "OTP Solutions," Oath Technologies webpage retrieved at http://www.oathtechnologies.com/otp-solutions.html on Jul. 17, 2013.
(Continued)

*Primary Examiner* — Shanto Abedin
*Assistant Examiner* — Adrian Stoica
(74) *Attorney, Agent, or Firm* — Hartman & Citrin LLC

(57) ABSTRACT

Concepts and technologies are disclosed herein for event-based security challenges. A computer can execute a security application. The computer can receive a request for authentication information associated with a user device. The computer can access event data corresponding to the user device. The computer can generate, based upon the event data, a challenge question and a response to the challenge question. The computer can provide data indicating the challenge question and the response to a requestor associated with the request.

20 Claims, 9 Drawing Sheets

Related U.S. Application Data continuation of application No. 13/945,359, filed on Jul. 18, 2013, now Pat. No. 9,298,898.

(56) References Cited

U.S. PATENT DOCUMENTS

| | | | |
|---|---|---|---|
| 8,181,029 B2 | 5/2012 | Cheswick | |
| 8,621,209 B1 | 12/2013 | Johansson | |
| 8,997,240 B1 | 3/2015 | Kohen et al. | |
| 9,183,595 B1* | 11/2015 | Avni | G06Q 50/00 |
| 9,348,981 B1 | 5/2016 | Hearn | |
| 9,536,439 B1* | 1/2017 | Goldstein | G09B 7/00 |
| 2005/0114679 A1* | 5/2005 | Bagga | G06F 21/46 |
| | | | 713/184 |
| 2009/0187986 A1 | 7/2009 | Ozeki | |
| 2009/0288150 A1 | 11/2009 | Toomim | |
| 2010/0229223 A1 | 9/2010 | Shepard et al. | |
| 2012/0216260 A1 | 8/2012 | Crawford et al. | |
| 2012/0244861 A1 | 9/2012 | Agarwal et al. | |
| 2013/0055346 A1 | 2/2013 | Singh et al. | |
| 2013/0160098 A1 | 6/2013 | Carlson | |
| 2013/0189953 A1 | 7/2013 | Mathews | |
| 2013/0318580 A1 | 11/2013 | Gudlavenkatasiva et al. | |
| 2014/0137219 A1 | 5/2014 | Castro et al. | |
| 2014/0189808 A1 | 7/2014 | Mahaffey et al. | |
| 2014/0189829 A1 | 7/2014 | McLachlan et al. | |
| 2014/0245431 A1 | 8/2014 | Barkai | |
| 2014/0259130 A1 | 9/2014 | Li et al. | |

OTHER PUBLICATIONS

Solidpass, "Event-based Security Token," SolidPass webpage retrieved at http://www.soildpass.com/authentication-methods/event-based-security-token.html on Jul. 17, 2013.

Andrew Y. Lindell, "Time versus Event Based One-Time Passwords," eToken, 2007, Aladdin Knowledge Systems, retrieved at http://www3.safenet-inc.com/blog/pdf/Time_vs_Event_Based_OTP.pdf on Jul. 17, 2013.

U.S. Office Action dated Dec. 8, 2014 in U.S. Appl. No. 13/945,359.
U.S. Office Action dated May 14, 2015 in U.S. Appl. No. 13/945,359.
U.S. Notice of Allowance dated Nov. 4, 2015 in U.S. Appl. No. 13/945,359.
U.S. Office Action dated Feb. 9, 2017 in U.S. Appl. No. 15/082,079.
U.S. Office Action dated Jun. 12, 2017 in U.S. Appl. No. 15/082,079.
U.S. Office Action dated Nov. 2, 2017 in U.S. Appl. No. 15/082,079.
U.S. Notice of Allowance dated Apr. 12, 2018 in U.S. Appl. No. 15/082,079.

* cited by examiner

EVENT-BASED SECURITY CHALLENGES

CROSS-REFERENCE TO RELATED APPLICATIONS

This application is a continuation of and claims priority to U.S. patent application Ser. No. 15/082,079, entitled "Event-Based Security Challenges," filed Mar. 28, 2016, now U.S. Pat. No. 10,083,284, which is incorporated herein by reference in its entirety; and which is a continuation of and claims priority to U.S. patent application Ser. No. 13/945,359, entitled "Event-Based Security Challenges," filed Jul. 18, 2013, now U.S. Pat. No. 9,298,898, which is incorporated herein by reference in its entirety.

BACKGROUND

This application relates generally to security and authentication. More specifically, the disclosure provided herein relates to event-based security challenges.

Mobile computing devices such as feature phones, smartphones, tablet computers, or the like have become popular tools used by modern consumers for a variety of purposes. Some consumers have nearly constant Internet access via a smartphone and/or other mobile computing devices. Some consumers may use mobile computing devices to conduct various types of transactions that in the past may have been reserved for completion using a desktop computer or other computing device.

Furthermore, while some consumers previously may have avoided the use of smartphones for some types of transactions due to privacy and/or security concerns, many modern consumers may use a smartphone or other mobile computing device for a variety of transactions and/or applications. Thus, some consumers access various web-based and/or remote content using mobile communications devices such as smartphones, laptop computers, or the like.

Some web-based and/or remote resources protect content using password protection, login credentials, and/or other controlled access technologies. Various resources such as websites and/or web-based applications may impose password and/or login requirements that differ from other providers. As such, users may be unable to use a single unified login and/or password formula for various websites and/or web-based resources. Rather, these users may rely upon memory to remember passwords and/or logins needed to access these and other types of resources. Because the number of these types of resources and/or the frequency with which consumers access these resources have grown exponentially over the past several years, consumers may rely upon lists of login credentials and/or need to use recover functionality to access websites and/or other resources.

Furthermore, consumers may carry smartphones, feature phones, and/or other mobile computing devices almost all the time. Thus, these devices have become popular alternatives to traditional computing systems and therefore may be relied upon more heavily by consumers for accessing protected resources. Because it may be difficult to access password lists and/or to maintain password lists on these devices, consumers may have difficulty accessing desired resources.

SUMMARY

The present disclosure is directed to event-based security challenges. According to various embodiments of the concepts and technologies described herein, a mobile computing device such as a smartphone may execute a security application and/or may interface with a web-based or cloud-based security service or security application that generates and/or uses event-based security challenges. A user device such as a smartphone, feature phone, tablet computer, or the like can execute a security application that can be configured to track events occurring via, in proximity to, and/or remote from the user device. An "event," as used herein can refer to a financial transaction such as a purchase, fund transfer, order, or the like; a telephone call made or received by the user device; a data transfer occurring via the user device; a social networking activity associated with a user or other entity associated with the user device; a person, device, system, or network detected at or near the device; or the like.

The security application can monitor activity of the device and detect events when the events occur. Based upon settings and/or preferences associated with the security application, the user device can collect event data and/or the user device can be prompted by other applications and/or entities to collect the event data. The event data can include location information, transaction information, call information, local device information, and/or other information that may be used to provide event-based security challenges as described herein. The user device can store the event data locally and/or transmit the event data to a security service or other application hosted by a real or virtual computing resource such as a server computer. The security service can be called by various resources to generate challenge questions ("challenges") and/or responses to the challenge questions ("responses") for entities requesting resources.

The security service can receive a request for a password, a request for authentication information, and/or other service calls from resources that are protected. In some embodiments, the resource can correspond to a server computer such as a web server that hosts a web resource such as a website, a web application, a file, an application, a database, combinations thereof, or the like. In response to receiving the request, the security service can access the event data associated with a user or user device attempting to access the resource, generate a challenge and/or response, package the challenge and/or response as challenge/response data, and transmit the challenge/response data to the resource for use in controlling access to the resource. The resource can format a challenge and provide the challenge to the requesting device, and match a response to the challenge/response data to determine if the requesting device is to be authenticated. If the requesting device is authenticated, the resource can allow the requesting device to access the resource.

The security service can be configured to update the event data periodically and/or whenever an event is detected at a user device. Thus, a user associated with a user device can be presented with a challenge/response that may correspond to recent activity. Some contemplated examples of challenges and/or responses include "where were you yesterday at 12:00 PM," "what was the last song you purchased on iTunes," "who was with you yesterday when you spent $53.45 at Costco," or the like. While these questions may be easy for a user to answer, someone not intimately familiar with a person's life and/or movements will be unable to gain access to the resource. As such, the user can benefit from eased access while enjoying a high level of security.

According to one aspect of the concepts and technologies disclosed herein, a method is disclosed. The method can include receiving, at a computer executing a security application, a request from a requestor, the request being for a challenge question and a response to be used in authenticating a user device and accessing, by the computer, event data corresponding to the user device. The computer can generate, based upon the event data, the challenge question and the response to the challenge question based upon the event data. The method also can include providing, by the computer, the challenge question and the response to the requestor.

In some embodiments, the requestor can include a web server, and in some embodiments, the web server can generate the request in response to detecting an access request from the user device. In some embodiments, the requestor presents the challenge question and the response to the user device to authenticate the user. The method also can include determining, by the computer, a difficulty level for the challenge question based upon a preference. In some embodiments, generating the challenge question can include generating the challenge question based upon the event data and the difficulty level. The difficulty level can include location data corresponding to a geographic location where an event happened and when an event happened. The difficulty level also can include a time and an amount associated with a transaction.

In some embodiments, the method further can include obtaining the event data from a further user device, and storing the event data at a data store. In some embodiments, the event data can be generated by the further user device and can be transmitted to the computer by the further user device. In some embodiments, the event data can include location data identifying a geographic location at which a financial transaction is initiated, and transaction data describing the transaction. The transaction data can include time information, data information, and information specifying an amount of the transaction.

According to another aspect of the concepts and technologies disclosed herein, a system is disclosed. The system can include a processor and memory storing computer-executable instructions that, when executed by the processor, cause the processor to perform operations. The operations can include receiving a request for authentication and/or authentication information associated with a user device, accessing event data corresponding to the user device, and generating a challenge question and a response to the challenge question based upon the event data. The operations also can include providing data indicating the challenge question and the response to a requestor associated with the request.

In some embodiments, the user device can include a smartphone executing a security application, and the user device or a different user device can generate the event data. In some embodiments, generating the event data can include detecting an event at a user device, determining an event type associated with the event, and determining if the event data is to be captured for the event based upon the event type. In response to a determination that the event data is to be captured, the operations further can include obtaining the event data and storing the event data at a data storage device.

In some embodiments, the user device can present a user interface for configuring a preference associated with a security service. The user device also can present a further user interface for configuring a further preference associated with the security application. In some embodiments, the system further can include computer-executable instructions that, when executed by the processor, cause the processor to determine a difficulty level for the challenge question based upon the preference. Generating the challenge question can include generating the challenge question based upon the event data and the difficulty level. In some embodiments the requestor can include a web server hosting a web application. In some embodiments, the event data can include location data identifying a geographic location at which a transaction is conducted, transaction data identifying a date, time, and amount associated with the transaction, and local device data identifying a device in a proximity associated with the user device when the transaction is conducted.

According to yet another aspect, a computer storage medium is disclosed. The computer storage medium can have computer-executable instructions stored thereon that, when executed by a processor, cause the processor to perform operations. The operations can include receiving a request for an authentication, authentication information, and/or a password for a user device (or a user associated with the user device), accessing event data corresponding to the user device or a user of the user device, and generating a challenge question and a response to the challenge question based upon the event data. The operations further can include providing data indicating the challenge question and the response to a requestor associated with the request.

In some embodiments, the computer storage medium further can include computer-executable instructions that, when executed by the processor, cause the processor to perform operations including obtaining the event data from a further user device (or the same user device), and storing the event data at a data storage device with data indicating an identity of the further user device or a user of the user device. The computer storage medium further can include computer-executable instructions that, when executed by the processor, cause the processor to perform operations including obtaining, from the user device, a preference that is to be used to generate the challenge question and the response, and storing the preference with the event data. In some embodiments, generating the challenge question can include generating the challenge question based upon the event data and the preference, and generating the response can include generating the response based upon the event data and the preference.

In some embodiments, the computer storage medium further can include computer-executable instructions that, when executed by the processor, cause the processor to perform operations including obtaining, from the user device, a preference that is to be used to generate the challenge question and the response. The operations also can include storing the preference with the event data, and determining a difficulty level for the challenge question based upon the preference. Generating the challenge question can include generating the challenge question based upon the event data and the difficulty level, and generating the response can include generating the response based upon the event data and the difficulty level. In some embodiments, the event data can include call data identifying a call conducted at the user device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to event-based security challenges. According to various embodiments of the concepts and technologies described herein, a smartphone or other mobile computing device may execute a security application and/or may interface with a security service configured to generate and/or enforce event-based security challenges. The security application can be configured to track events occurring via and/or in proximity to the user device and collect event data. The event data can include location information, transaction information, call information, local device information, and/or other information that may be used to provide event-based security challenges as described herein. The user device can store the event data locally and/or transmit the event data to the security service. The security service can be called by various resources to generate event-based challenges/responses for entities requesting access to resources such as webpages, web applications, or the like.

The security service can receive a request for authentication information (e.g., a challenge question and response to the challenge question), a password and/or other service call from a resource or a user device. In response to receiving the request, the security service can access the event data associated with a user or user device attempting to access the resource, generate a challenge and/or response, package the challenge and/or response as challenge/response data, and transmit the challenge/response data to the resource for use in controlling access to the resource. The resource can format a challenge and provide the challenge to the requesting device, and match a response to the challenge/response data to determine if the requesting device is to be authenticated. If the requesting device is authenticated, the resource can allow the requesting device to access the resource.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
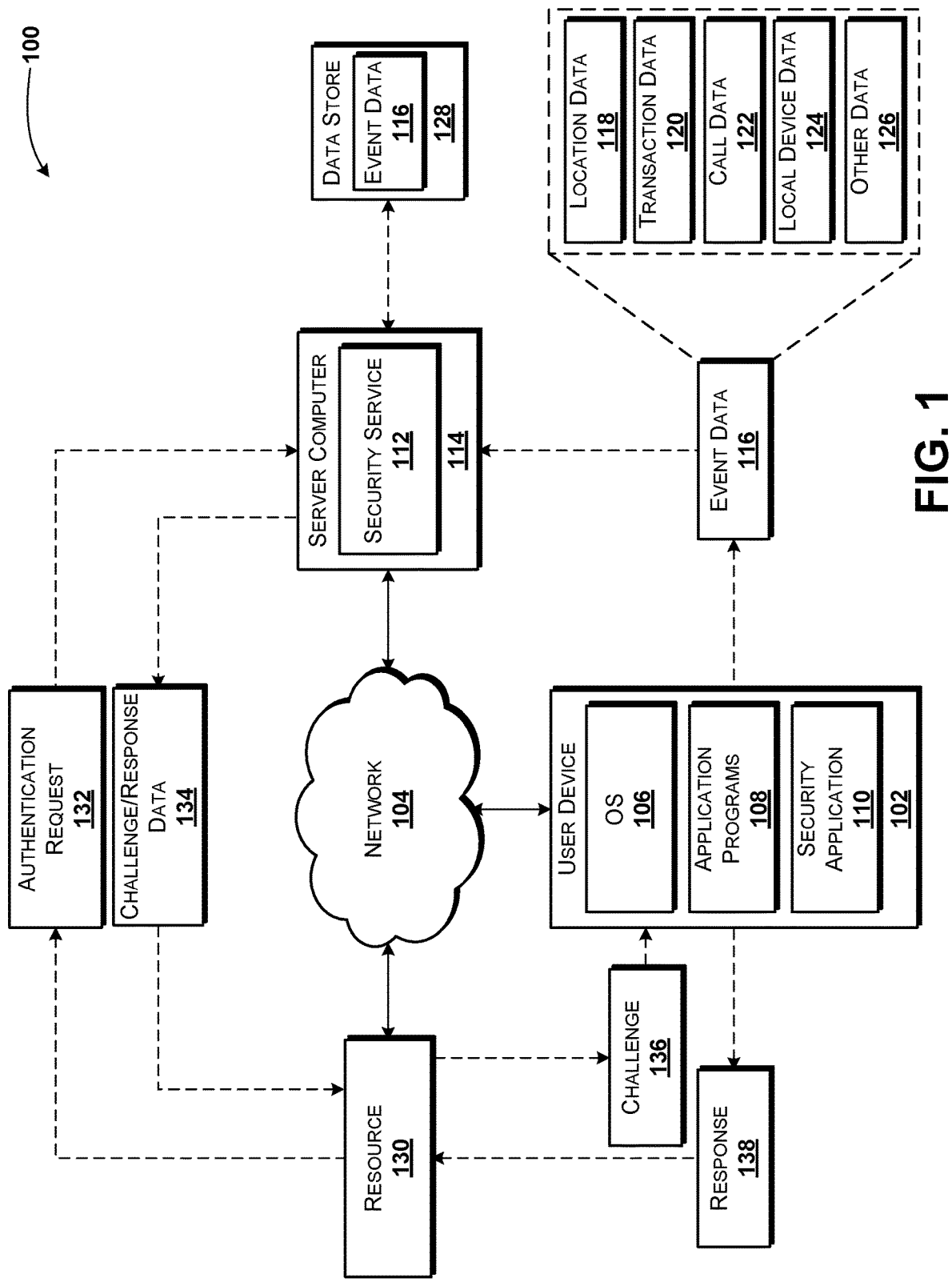
FIG. 1 is a system diagram illustrating an illustrative operating environment for the various embodiments disclosed herein.

Referring now to FIG. 1, aspects of an operating environment 100 for various embodiments of the concepts and technologies disclosed herein for event-based security challenges will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more smartphones, feature phones, personal digital assistants ("PDAs"), laptop computers, tablet computers, other mobile computing devices, other computing systems, combinations thereof, or the like. It should be understood that the functionality of the user device 102 can be provided by a single device, by two similar devices, and/or by two or more dissimilar devices. For purposes of describing the concepts and technologies disclosed herein, the user device 102 is described herein as a smartphone or other form of mobile computing device. It should be understood that this embodiment is illustrative, and should not be construed as being limiting in any way.

The user device 102 can execute an operating system 106 and one or more application programs 108. The operating system 106 is a computer program for controlling the operation of the user device 102. The application programs 108 are executable programs configured to execute on top of the operating system 106 to provide various functions. In some embodiments, the application programs 108 can include, but are not limited to, web browsers, web applications, native applications, password management applications, electronic transaction management applications ("eWallet applications"), combinations thereof, or the like. Because various forms of application programs 108 are generally understood, the application programs 108 are not described in additional detail herein.

The user device 102 also can be configured to host and/or execute a security application 110. The security application 110 can be configured to provide the functionality described herein for providing event-based security challenges and/or to interface with a remote service to provide event-based security challenges. In the embodiment illustrated in FIG. 1, the security application 110 is configured to interact with a remote service to provide the event-based security challenges. This embodiment is illustrative and should not be construed as being limiting in any way.

In particular, the security application 110 can be configured to communicate with a security service 112 that is hosted and/or executed by a computing system such as the server computer 114. The functionality of the server computer 114 can be provided by one or more real or virtual computing resources. As such, it should be understood that the security service 112 can be provided as a virtual service to one or more users. In some embodiments, for example, various devices such as the user device 102 can call the security service 112 to create passwords, to create challenge questions and/or responses to challenge questions, to provide data used by the security service 112 to create passwords, to authenticate with various resources via the security service 112, combinations thereof, or the like.

In the illustrated embodiment, the security application 110 executed by the user device 102 can be configured to collect event data 116 associated with the user device. As used herein, the term "event data" can include any data relating to a state at the user device 102, sensor data and/or readings at the user device 102, transaction contents and/or data associated with transactions undertaken with the user device 102 and/or by a user associated with the user device 102, information indicating users, devices, systems, and/or networks accessible or near the user device 102, combinations thereof, or the like. Some examples of the event data 116 are described in additional detail below.

In the illustrated embodiment, the event data 116 can include, but is not limited to, location data 118, transaction data 120, call data 122, local device data 124, other data 126, combinations thereof, or the like. Some examples of each of these types of data are described below. Because the event data 116 can include these and other types of data and/or can omit the above types of data, it should be understood that these examples are illustrative and therefore should not be construed as being limiting in any way.

The location data 118 can indicate a geographic location associated with the user device 102. The location data 118 can be captured by the user device 102 using various location-determination technologies. For example, the user device 102 can include one or more global positioning system ("GPS") receivers via which a location of the user device 102 can be determined by the user device 102. Additionally or alternatively, the user device 102 can use one or more assisted GPS ("A-GPS") technologies to determine location such as, for example, scanning a proximity associated with the user device 102 to determine one or more wireless networks, location beacons, or the like in communication with the user device 102. Additionally, or alternatively, the user device 102 can execute one or more location determination applications configured to determine a location of the user device 102 by monitoring movements of the user device using various sensors such as, for example, magnetometers, accelerometers, gyroscopes, or the like.

The user device 102 also can rely upon triangulation techniques to determine a location associated with the user device 102. For example, the user device 102 can communicate with three or more cellular towers or other wireless transmitters and/or transceivers to determine a location of the user device 102 using triangulation. Still further, the user device 102 can obtain location data 118 from a cellular network and/or other networks or devices. Because various technologies and/or combinations thereof can be used to determine the location data 118, it should be understood that these examples are illustrative and therefore should not be construed as being limiting in any way.

The transaction data 120 can include, but is not limited to data relating to one or more transactions conducted using the user device 102 and/or one or more transactions conducted by a user associated with the user device 102. In some embodiments, the transaction data 120 can include a record of transactions conducted using a near field communications ("NFC") transmitter associated with the user device 102, a radio frequency identification ("RFID") device associated with the user device 102, and/or other transmitters/receivers/transceivers associated with the user device 102. Thus, for example, if goods or services are paid for using a hardware component associated with the user device 102, the user device 102 can be configured to track, via execution of the security application 110, data such as a purchase amount, a payee, a time of day, a date, a location, or the like as the transaction data 120.

Additionally, or alternatively, the user device 102 can be configured to track the transaction data 120 by communicating with one or more applications executed by the user device 102. Thus, if an application is used to purchase goods or services, the security application 110 can be configured to track this information and pass that information to the security service 112 as the transaction data 120. Contemplated examples of applications that can be used to pay for goods or services include, but are not limited to, applications that pass information associated with payment cards; applications that generate and/or present bar codes, QR codes and/or other optical indicators of payment information; applications that facilitate and/or support various forms of electronic funds transfers; combinations thereof; or the like. Because the security application 110 can be configured to track almost any type of transaction occurring at or associated with the user device 102, it should be understood that these examples are illustrative and therefore should not be construed as being limiting in any way.

The call data 122 can include call logs associated with the user device 102. The call logs can include, for example, call information such as calling numbers, called numbers, call duration, call time, call date, protocols and/or messaging information, statistics and/or resource information, combinations thereof, or the like. The call data 122 can be maintained by the user device 102 and/or can be obtained by the user device 102 from other devices or systems such as one or more devices operating as a part of and/or in communication with a cellular network. Furthermore, it should be understood that the security application 110 can be configured to track calls occurring over data channels in addition to, or instead of, calls conducted over a voice channel. Thus, the security application 110 can be configured to track voice over internet protocol ("VoIP") calls, video calls, or the like in addition to, or instead of, voice calls made using the user device 102 via a voice channel of a communications network. Because additional and/or alternative types of calls may be tracked by the security application 110, it should be understood that these examples are illustrative and therefore should not be construed as being limiting in any way.

The local device data 124 can describe and/or capture information associated with one or more devices in communication with the user device 102 at a particular time. Thus, for example, the local device data 124 can describe or identify one or more networks, routers, hotspots, or other devices such as, for example, computers, mobile phones, automobiles, location beacons, gateways, or the like, in the vicinity and/or proximity of the user device 102 at a particular time. Thus, for example, the local device data 124 can be used to identify one or more users or systems located at or near the user device 102 at a particular time such as, for example, a time at which a transaction is completed, a time of day, a date, or the like. It should be understood that these examples are illustrative and therefore should not be construed as being limiting in any way.

The other data 126 can include, but is not limited to, social networking information associated with a user of the user device 102, identification information associated with the user and/or other entities or devices in a proximity associated with the user device 102, store or service locations at which transactions or other events occur, preferences associated with the security application 110 and/or the security service 112, combinations thereof, or the like. The other data 126 also can include sound and/or ambient lighting conditions at or near the user device 102 and therefore can be used to track, for example, voices, music, sounds, or other audio information that may be used to identify events, or the like. Because other types of information can be used to provide the functionality described herein, it should be understood that these examples are illustrative and therefore should not be construed as being limiting in any way.

The other data 126 also can identify the user device 102 and/or a user associated with the user device 102. As such, the other data 126 can be used to associate the various event data 116 described herein with the user device 102 and/or a user thereof. Because the other data 126 can include data associated with almost any kind of event, it should be understood that these examples are illustrative and therefore should not be construed as being limiting in any way.

The event data 116 can be captured and/or generated by the user device 102 in some embodiments. In some other embodiments, the event data 116 can be generated and/or obtained by the security service 112. Thus, it should be understood that in some embodiments the user device 102 generates some, none, or all of the event data 116 while in some other embodiments the event data 116 is obtained by the security service 112 by the user device 102 and/or other devices or systems. Thus, while FIG. 1 illustrates the event data 116 being provided to the security service 112 by the user device 102, it should be understood that this is one illustrative embodiment and therefore should not be construed as being limiting in any way.

The security service 112 can be configured to store the event data 116 at a real or virtual data storage location such as, for example, a memory, a server computer, a database, a data store, or the like. In the illustrated embodiment of FIG. 1, the security service 112 can be configured to store the event data 116 at a data store 128. The functionality of the data store 128 can be provided by one or more server computers, databases, laptop computers, flash memory devices, hard drives, virtual storage resources, combinations thereof, or the like. The security service 112 can be configured to store the event data 116 and to access the event data 116 to generate challenges and/or responses. Users can be authenticated based upon the challenge/response generated by the security service 112, if desired. It should be understood that these examples are illustrative and therefore should not be construed as being limiting in any way.

In operation, the user device 102 may request a resource 130. The resource 130 can correspond to a service, a webpage, an application, a web application, a file, a database, and/or other types of electronic resources hosted and/or executed by a server computer, a web server, a database or data store, and/or other hardware. The resource 130 may be protected by a password and/or may otherwise require the user device 102 to authenticate to obtain access to the resource 130.

In some embodiments, the resource 130 can be configured to generate a call to the security service 112 to request data that can be used by the resource 130 to tailor a challenge and/or response for the user device 102. In FIG. 1, the resource 130 is illustrated as generating the call by transmitting an authentication request 132 to the security service 112. It should be understood that this example is illustrative and therefore should not be construed as being limiting in any way.

The security service 112 can be configured to receive the authentication request 132 or other call from the resource 130. The security service 112 can identify a user associated with the user device 102 and/or can be configured to identify the user device 102. In some embodiments, an identity of the user or user device 102 can be submitted to the security service 112 with the authentication request 132. Based upon an identity of the user, the user device 102, and/or a user of the user device 102, the security service 112 can identify event data 116 associated with the user and/or user device 102 and tailor a challenge/response for the user device 102 based upon that event data 116. Thus, the security service 112 can be configured to respond to an authentication request 132 with challenge/response data 134 that can be used by the resource 130 to control access to the resource 130.

Upon receiving the challenge/response data 134, the resource 130 can be configured to generate a challenge 136 for the user device 102 and/or a user accessing the resource 130 via the user device 102. The resource 130 can generate the challenge 136 based upon the challenge/response data 134. The challenge 136 can include, for example, a challenge for the user to identify a particular transaction or details of a transaction, a challenge for the user to identify a location and/or a time or date at which the user device 102 was at that location, a challenge for the user to identify a user that was in a proximity of the user device 102 at a particular time, a challenge for the user to identify a location at which a transaction occurred, a challenge for the user to identity a time or date at which the user device 102 was at or near another device or system such as an automobile or location beacon, a challenge for a user to identify a call and/or details of the call made or received by the user and/or at the user device 102, combinations thereof, or the like.

While various embodiments of the concepts and technologies described herein are described with regard to the user device 102, it should be understood that the concepts and technologies described herein can be used to generate and/or present challenge/response data 134 for users regardless of an identity of a user device 102 used to access a particular resource 130. Thus, users may access the resource 130 via any number of devices such as mobile phones, laptop computers, desktop computers, smartphones, embedded computer systems, set-top boxes or units ("STBs" or "STUs"), other computing systems, or the like, and the concepts and technologies described herein can be used to generate the challenge/response data 134 for the user regardless of the identity of the device used to access a particular resource 130.

Furthermore, a user device (e.g., the user device 102) may be used to access a resource 130 and may receive the challenge 136 and/or response 138, while another or further user device and/or multiple user devices may be used to generate the event data 116. Furthermore, while the claims mention authentication of a user device, it should be understood that a user, and not a user device, may be authenticated in accordance with various embodiments of concepts and technologies described herein. Thus, while examples of the concepts and technologies described herein are described herein as being performed with regard to a particular user device 102, it should be understood that these examples are illustrative and therefore should not be construed as being limiting in any way.

The user device 102 can respond to the challenge 136 with a response 138. The response 138 can include, for example, data identifying a time, date, location, amount, person, device, good, service, other information, or the like. The response 138 can be formatted in various formats including, but not limited to, text, numeric values, strings, or the like. The user device 102 can submit the response 138 to the resource 130, and the resource 130 can compare the response 138 to the challenge/response data 134 received by the resource 130 to determine if the user device 102 has correctly answered the challenge 136. If the response 138 correctly answers the challenge 136, the resource 130 can allow the user device 102 to access the resource 130 and/or data hosted or provided by the resource 130. If the response 138 does not correctly answer the challenge 136, the resource 130 can deny access to the resource 130 and/or data hosted or provided by the resource 130 for the user device 102.

According to various embodiments, the security application 110 and/or the security service 112 can update the event data 116 frequently. The frequency with which the event data 116 is updated can be set by a user or other entity, by software settings or preferences, and/or by entities associated with the security service 112. As such, it can be appreciated that the security service 112 can generate the challenge/response data 134 on demand, and that the challenge/response data 134 can change based upon the updated event data 116. Because the event data 116 can be updated frequently, the event data 116 and therefore challenges 136 and responses 138 based thereon can correspond to recent transactions, activities, or other events and therefore may be easy for a user to recall, though this is not necessarily the case. Additional details of formatting challenges 136 and/or responses 138 are illustrated and described below, particularly with reference to FIGS. 2-4C.

Although the security application 110 is illustrated as a component of the user device 102, it should be understood that the security application 110 may be embodied as or in a stand-alone device or component thereof operating as part of or in communication with the network 104 and/or the user device 102. As such, the illustrated embodiment should be understood as being illustrative of only some contemplated embodiments and should not be construed as being limiting in any way.

FIG. 1 illustrates one user device 102, one network 104, one server computer 114, one data store 128, and one resource 130. It should be understood, however, that various implementations of the operating environment 100 include zero, one, or more than one user device 102, zero, one, or more than one network 104, zero, one, or more than one server computer 114, zero, one, or more than one data store 128, and/or zero, one, or more than one resource 130. As such, the illustrated embodiment should be understood as being illustrative, and should not be construed as being limiting in any way.

Figure 2:
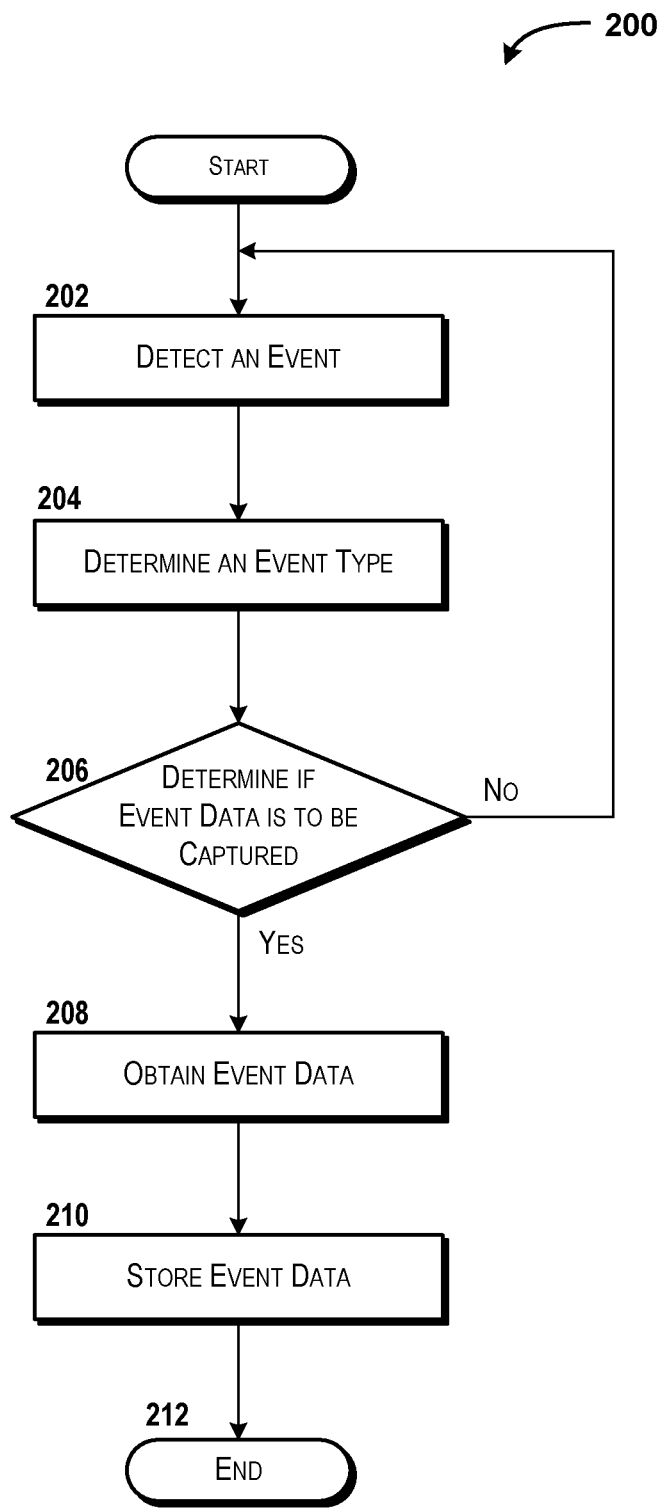
FIG. 2 is a flow diagram showing aspects of a method for obtaining event data, according to an illustrative embodiment.

Turning now to FIG. 2, aspects of a method 200 for obtaining event data will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102, the server computer 114, and/or the resource 130 to perform one or more operations and/or causing the processor to direct other components of the computing system or device to perform one or more of the operations.

For purposes of illustrating and describing the concepts of the present disclosure, the method 200 is described as being performed by the user device 102 via execution of one or more software modules such as, for example, the security application 110. It should be understood that additional and/or alternative devices and/or network nodes can provide the functionality described herein via execution of one or more modules, applications, and/or other software including, but not limited to, the security application 110. Thus, the illustrated embodiment is illustrative, and should not be viewed as being limiting in any way.

The method 200 begins at operation 202. In operation 202, the user device 102 detects an event. According to various embodiments, the event detected by the user device 102 can include an event occurring at the user device 102, an event associated with a user of the user device 102 (but not necessarily occurring at the user device 102), an event occurring in a proximity of the user device 102, combinations thereof, or the like. Thus, the event can include a transaction such as a purchase of goods or services, a telephone call, a data session, or the like; a movement to, from, or within a location; communications with a device, system, network, or the like; a download, upload, or other data transfer; a social networking post, tweet, or other data publication; other events; combinations thereof; or the like. The events are not limited to these examples. As such, it should be understood that these examples are illustrative and therefore should not be construed as being limiting in any way.

From operation 202, the method 200 proceeds to operation 204. In operation 204, the user device 102 determines an event type associated with the event detected in operation 202. Thus, the user device 102 can be configured to determine, for example, if the event detected in operation 202 corresponds to a purchase, a transaction, a telephone call, a data transfer, a location-based event, another type of event, or the like. The determination made in operation 204 can be made to determine if event data 116 associated with the event is to be captured and/or for additional or alternative reasons, though this is not necessarily the case.

From operation 204, the method 200 proceeds to operation 206. In operation 206, the user device 102 can determine if the event detected in operation 202 is a type of operation for which event data 116 is to be captured. According to various embodiments, the user device 102 can be configured to examine one or more settings or preferences associated with the security application 110 to determine if the event data 116 is to be captured for the event type determined in operation 204. According to some other embodiments, the user device 102 can be configured to capture event data 116 for events that occur at particular times or locations, for events that are associated with a particular amount, and/or for other types of events. Thus, operation 206 can correspond to the user device 102 examining preferences, settings, and/or other information to determine if event data 116 associated with the event detected in operation 202 is to be captured.

If the user device 102 determines, in operation 206, that the event data 116 is not to be captured, the method 200 can return to operation 202 and event data 116 may not be captured for the event detected in operation 202. It should be understood that the method 200 also can end if the user device 102 determines, in operation 206, that the event data 116 is not to be captured. If the user device 102 determines, in operation 206, that the event data 116 is to be captured, the method 200 can proceed to operation 208.

In operation 208, the user device 102 can obtain event data 116 associated with the event detected in operation 202. As explained above, the event data 116 captured in operation 208 can include, for example, location data 118, transaction data 120, call data 122, local device data 124, other data 126, and/or combinations thereof Thus, for example, the event data 116 can indicate a telephone call that was made or received using the user device 102; a location at or near which the telephone call was made or received; a time and/or data at which the telephone call was made or received; devices, networks, and/or systems at or near the user device 102 when the telephone call was made or received; or the like. As noted above, the event may not include a telephone call, and as such, this example is illustrative and should not be construed as being limiting in any way.

Similarly, the event data 116 can indicate a transaction that was completed or initiated using the user device 102 and/or by a user associated with the user device 102. The transaction data 120 can include, for example, an amount of the transaction, a time, date, or location associated with the transaction, a vendor or provider associated with the transaction, an amount of the transaction, a description of goods or services purchased during the transaction, combinations thereof, or the like. Because the event data 116 can correspond to almost any kind of event occurring at the user device 102 and/or occurring in association with a user associated with the user device 102, it should be understood that these examples are illustrative and therefore should not be construed as being limiting in any way.

From operation 208, the method 200 proceeds to operation 210, wherein the user device 102 can store the event data 116. According to some embodiments, the user device 102 can be configured to store the event data 116 at a local data storage device such as a flash memory, memory, a disk drive, or the like. The user device 102 also can be configured to transmit the event data 116 to the security service 112 for storage at a remote data storage location such as the data store 128. Because the event data 116 can be stored at additional and/or alternative data storage locations, it should be understood that these examples are illustrative and therefore should not be construed as being limiting in any way.

From operation 210, the method 200 proceeds to operation 212. As mentioned above, the method 200 also can proceed to operation 212 from operation 206 if the user device 102 determines, in operation 206, that event data 116 associated with the event detected in operation 202 is not to be captured. The method 200 ends at operation 212.

Although not explicitly illustrated in FIG. 2, it should be understood that the event data 116 can be updated at almost any time. Thus, the event data 116 stored at the data store 128 can be updated with recent events to attempt to ensure that challenges/responses generated by the security service 112 are frequently updated and/or recent. Thus, challenges 136 generated by the security service 112 may relate to recent events. As such, some embodiments of the concepts and technologies described herein can be used to ease the effort with which users can response to the challenges 136 by ensuring that the challenges 136 relate to recent events. Thus, in some embodiments, the user may remember events associated with the challenges 136 and therefore some embodiments of the concepts and technologies described herein may simply access control for users while maintaining a high level of security. It should be understood that this example is illustrative and therefore should not be construed as being limiting in any way.

Figure 3:
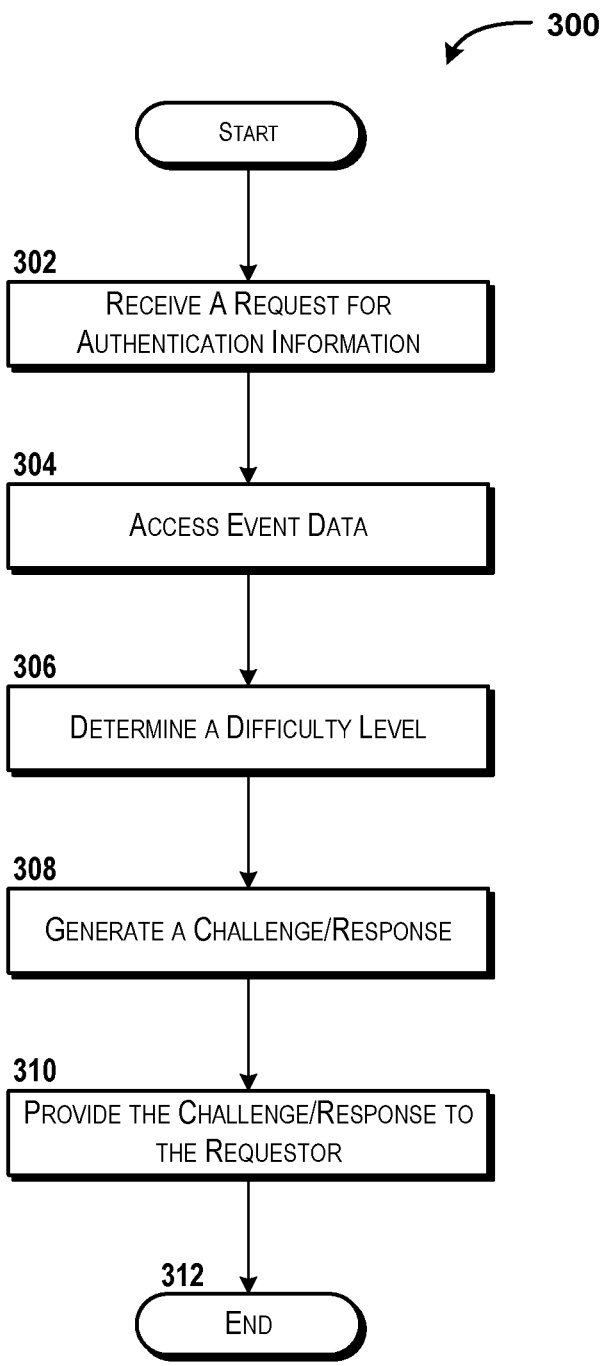
FIG. 3 is a flow diagram showing aspects of a method for generating an event-based security challenge, according to another illustrative embodiment.

Turning now to FIG. 3, aspects of a method 300 for generating an event-based security challenge will be described in detail, according to an illustrative embodiment. For purposes of illustrating and describing the concepts of the present disclosure, the method 300 is described as being performed by the server computer 114 via execution of one or more software modules such as, for example, the security service 112. It should be understood that additional and/or alternative devices and/or network nodes can provide the functionality described herein via execution of one or more modules, applications, and/or other software including, but not limited to, the security service 112. Thus, the illustrated embodiment is illustrative, and should not be viewed as being limiting in any way.

The method 300 begins at operation 302. In operation 302, the server computer 114 receives a request for authentication information, a request for a password, and/or a request for data that can be used to generate a challenge 136 and a response 138. As used in the claims, a "request for an authentication" includes a request for the challenge/response data 134 and/or a request for data that can be used to generate and/or present the challenge 136 and response 138 described herein. In some embodiments, the request received in operation 302 can correspond to the authentication request 132 illustrated and described in FIG. 1. In various embodiments, the request received in operation 302 can correspond to a service call by a resource 130 and/or other entities or devices. Thus, it should be understood that the security service 112 can function as a virtualized service that can be called by various entities to obtain challenges and/or responses.

From operation 302, the method 300 proceeds to operation 304. In operation 304, the server computer 114 accesses event data 116. According to various embodiments, the server computer 114 can access the event data 116 stored at the data store 128. The server computer 114 can be configured to identify a user and/or user device 102 associated with the request received in operation 302 and therefore can query the event data 116 stored at the data store 128 for event data 116 associated with the user and/or user device 102. Thus, in operation 304, the server computer 114 can access event data 116 to identify event data 116 associated with the user and/or user device 102.

From operation 304, the method 300 proceeds to operation 306. In operation 306, the server computer 114 can determine a difficulty level. The "difficulty level" as used herein can refer to a scope of the challenge 136 to be generated by the security service 112. For example, if the security service 112 is to generate a challenge 136 based upon location data 118, the difficulty level can correspond to a type of location challenge 136 to be generated. Types of location challenges 136 can include, for example, definitions of location such as a street address, a city block or intersection, a ZIP code, a city, a state, or a country. Thus, it can be appreciated that the definition can range from a narrow definition of location (street address) to a broad definition of location such as a country or state. The difficulty level can be specified by one or more preferences, settings, and/or configurations associated with the security application 110 and/or the security service 112, though this is not necessarily the case.

According to various embodiments, the security service 112 can be configured to vary the difficulty of the challenge 136 based upon the type of resource 130 that is being accessed and/or for which the challenge/response data 134 is being requested. For example, if the resource 130 corresponds to a social networking site, the difficulty of challenges 136 may be lower than a difficulty level used for a challenge 136 for accessing a resource 130 such as a banking website, a trading site, or the like. As such, embodiments of the concepts and technologies described herein can support varying a scope of the challenge 136 based upon a type of resource 130 being accessed.

Another example of a difficulty level can include, for example, a degree of accuracy required for verifying a transaction amount. For example, a difficulty level associated with transaction particulars may include requiring an accuracy within zero, one, or two decimal places; accuracy to within one dollar; accuracy to within ten dollars; accuracy to within one hundred dollars, or the like. Another example of difficulty levels can include, for example, a date of a telephone call, a time of a telephone call, a recipient of the telephone call or a calling party associated with the telephone call, a duration of the telephone call, a location at which the call was made or received, combinations thereof, or the like. Another example of a difficulty level can include, for example, combinations of various types of event data 116 such as a time, date, and location at which a transaction was begun or completed. Because the difficulty levels can be defined in various ways, it should be understood that these examples are illustrative and therefore should not be construed as being limiting in any way.

From operation 306, the method 300 proceeds to operation 308. In operation 308, the server computer 114 can generate data specifying a challenge and response. The server computer 114 can generate the challenge/response data 134 based upon the event data, preferences associated with the security application 110 and/or the security service 112, and/or difficulty level identified in operations 304-306. As will be illustrated and described in more detail with reference to FIGS. 4A-4C below, users and/or other entities can configure challenges 136 and/or responses 138 based upon a variety of considerations. Thus, the security service 112 can be configured to generate the challenge/response data 134 based upon the preferences, settings, and/or other considerations as will be apparent with reference to FIGS. 4A-4C below. The server computer 114 can determine the challenges 136 and/or response 138 to the challenges 136 and package the challenge/response as the challenge/response data 134. It should be understood that this example is illustrative and therefore should not be construed as being limiting in any way.

From operation 308, the method 300 proceeds to operation 310. In operation 310, the server computer 114 provides the challenge 136 and response 138 to the requestor. In the embodiment shown in FIG. 1, the security service 112 can provide the challenge 136 and the response 138 to the resource 130. In some other embodiments, the server computer 114 can provide the challenge and the response to the resource 130 by transmitting the challenge/response data 134 to the resource 130. It can be appreciated that the challenge 136 and response 138 can be provided to the resource as the challenge/response data 134. It also should be appreciated that the security service 112 can be configured to encrypt the challenge/response data 134 prior to transmission, if desired.

From operation 310, the method 300 proceeds to operation 312. The method 300 ends at operation 312.

While the method 300 illustrated in FIG. 3 is illustrated and described as an embodiment wherein the security service 112 provides the challenge/response data 134 to the resource 130, it should be understood that other embodiments are contemplated and are possible. In particular, some embodiments of the concepts and technologies described herein support redirect operations, wherein the user device 102 can be redirected by the resource 130 to complete a password or authentication operation with the security service 112 directly. Thus, if the user device 102 attempts to access the resource 130, the resource 130 can be configured to redirect the user device 102 to the security service 112, and the security service can configure and present the challenge 136 to the user device 102 directly. Furthermore, the security service 112 can be configured to examine a response 138 to the challenge 136 to determine if the user device 102 is to be allowed to access the resource 130. It should be understood that this example is illustrative and therefore should not be construed as being limiting in any way.

Figure 4A:
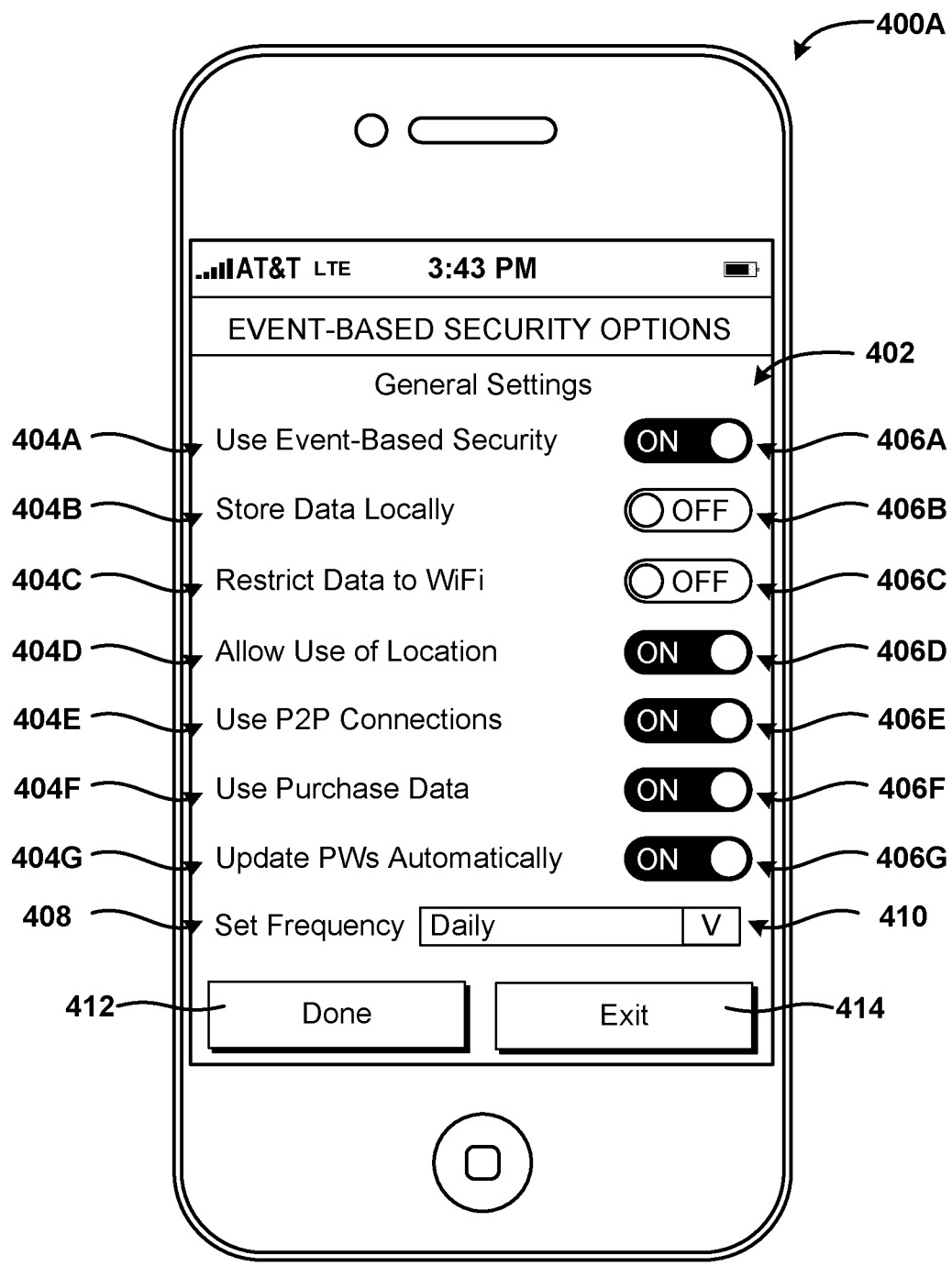
FIGS. 4A-4C are user interface diagrams illustrating user interfaces for configuring and using event-based security challenges, according to some illustrative embodiments.
Figure 4B:
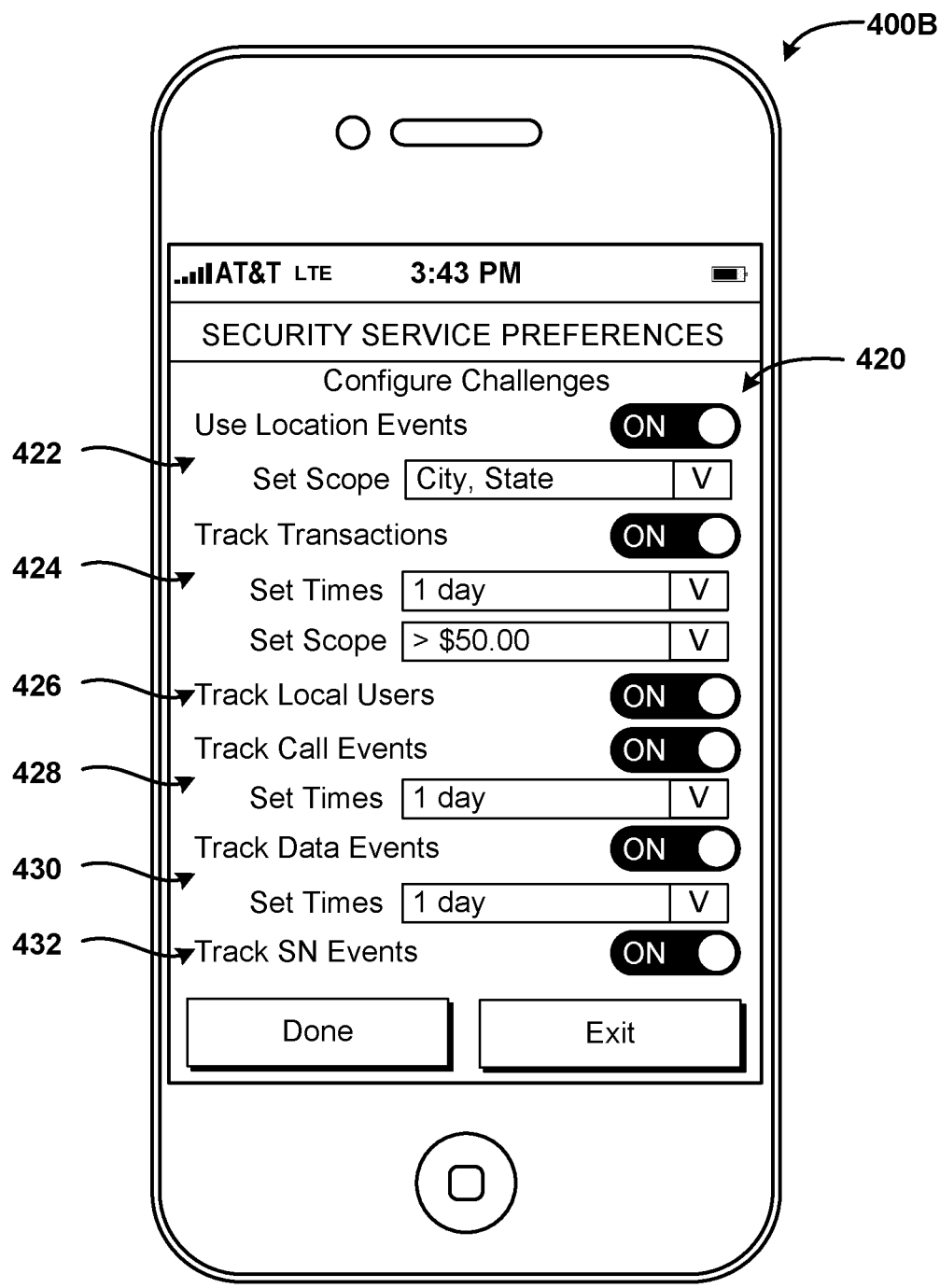
Figure 4C:
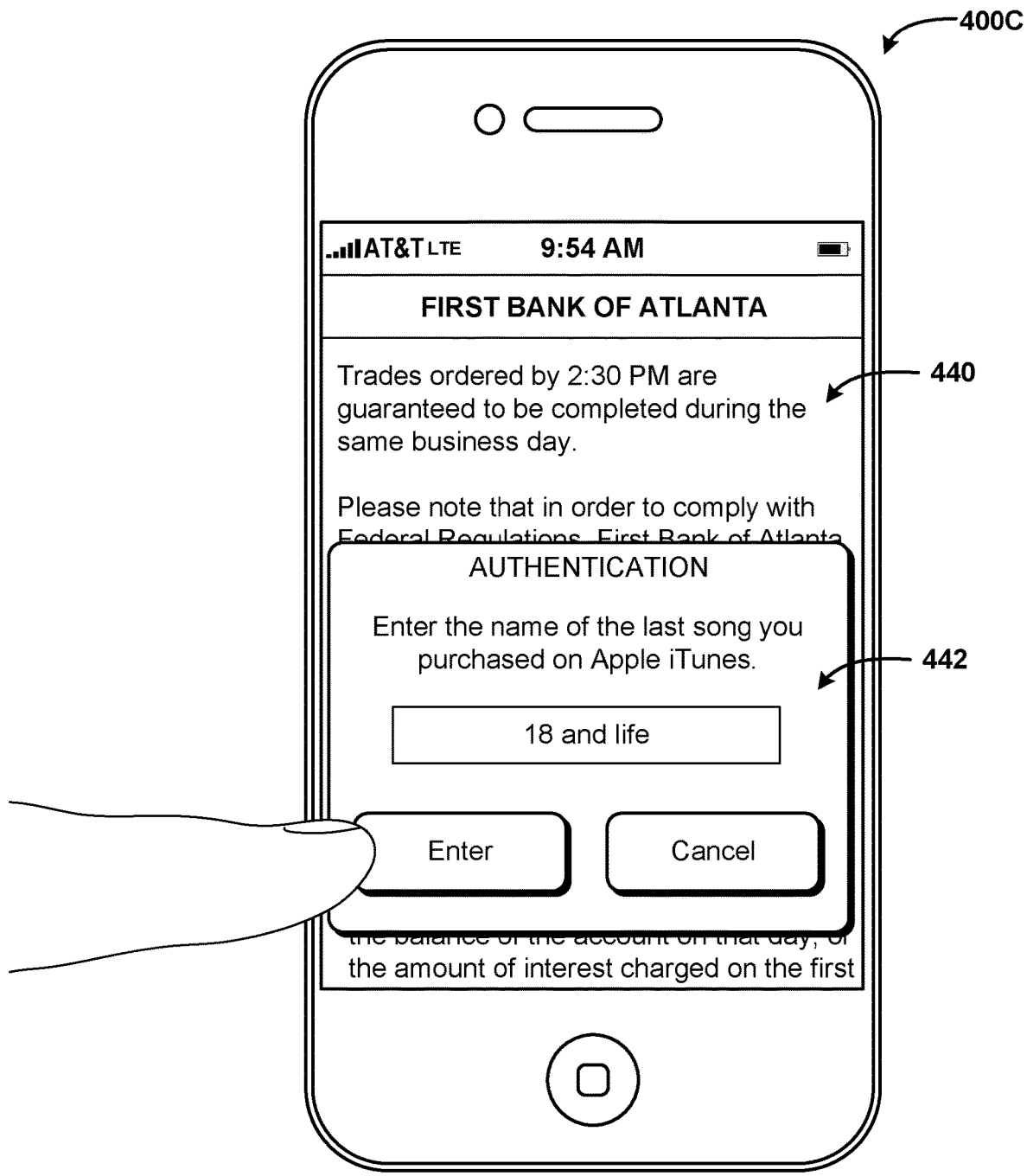

FIGS. 4A-4C are user interface ("UI") diagrams showing aspects of UIs for configuring and/or providing event-based security challenges, according to some illustrative embodiments of the concepts and technologies described herein. FIG. 4A shows an illustrative screen display 400A generated by a device such as the user device 102. According to various embodiments, the user device 102 can generate the screen display 400A and/or other screen displays in conjunction with execution of the security application 110. It should be appreciated that the UI diagram illustrated in FIG. 4A is illustrative of one contemplated example of the UIs and therefore should not be construed as being limited in any way.

The screen display 400A can include various menus and/or menu options (not shown in FIG. 4A). The screen display 400A also can include an event-based security options screen 402, which can be interacted with by a user or other entity to configure the security application 110 and/or the security service 112. For purposes of illustrating and describing the concepts and technologies disclosed herein, the event-based security options screen 402 is illustrated as showing a number of configurable options, which are described in additional detail below. It should be understood that this example is illustrative, and should not be construed as being limiting in any way.

As mentioned above, the event-based security options screen 402 can include a number of event descriptors 404A-G (hereinafter collectively and/or generically referred to as "event descriptors 404"). The event descriptors 404 can be interacted with by a user or other entity to select and/or de-select types of events to be used to generate event-based security challenges as described herein. The various example event descriptors 404 are described below. Because additional and/or alternative types of event descriptors 404 can be displayed and/or interacted with via the event-based security options screen 402, it should be understood that these examples are illustrative and therefore should not be construed as being limiting in any way.

The event descriptor 404A can be used to turn on or turn off the use of event-based security challenges. In the illustrated embodiment, a user can select or de-select the UI control 406A to activate or deactivate the use of event-based security challenges. It can be appreciated from the description herein that the selection or de-selection of the UI control 406A can activate or deactivate the security application 110 and/or the security service 112. It should be understood that this example is illustrative and therefore should not be construed as being limiting in any way.

The event descriptor 404B can be used to turn on or turn off local storage of event data 116. Because the event-based security options screen 402 can be presented at the user device 102, it can be appreciated that the selection of the UI control 406B can cause the user device 102 to activate and/or deactivate storage of the event data 116 at the user device 102. It should be understood that this example is illustrative and therefore should not be construed as being limiting in any way.

The event descriptor 404C can be used to turn on or turn off an option to restrict data communications associated with the security application 110 and/or the security service 112 to WI-FI. Thus, selection of the UI control 406C can cause the user device 102 to activate and/or deactivate usage of cellular data networks and/or other data networks or connections for transmitting data associated with the security application 110 and/or the security service 112. It should be understood that this example is illustrative and therefore should not be construed as being limiting in any way.

The event descriptor 404D can be used to enable or disable location-based services associated with the security application 110 and/or the security service 112. Thus, the event descriptor 404D can be interacted with by a user or other entity to enable or disable the use of location data 118 as part of the event data 116. Thus, selection of the UI control 406D can cause the user device 102 to activate and/or deactivate usage of location data by the security application 110 and/or the security service 112. It should be understood that this example is illustrative and therefore should not be construed as being limiting in any way.

The event descriptor 404E can be used to turn on or turn off usage of peer-to-peer ("P2P") or machine-to-machine ("M2M") transmitters by the security application 110. As explained above, the security application 110 can be configured to identify users, devices, systems, and/or networks in a proximity of the user device 102. According to various embodiments, these devices can be identified by activating various transmitters, receivers, or transceivers such as infrared ("IR") transmitters, receivers, or transceivers; NFC transmitters, receivers, or transceivers; BLUETOOTH and/or other M2M or P2P transmitters, receivers, or transceivers; WI-FI transmitters, receivers, or transceivers; combinations thereof; or the like. Users or other entities may wish to disable this capability to enhance battery life of the user device 102, to address security or privacy concerns, and/or for other reasons. Thus, selection of the UI control 406E can cause the user device 102 to activate and/or deactivate usage of various long and/or short range transmitters, receivers, or transceivers by the security application 110. It should be understood that this example is illustrative and therefore should not be construed as being limiting in any way.

The event descriptor 404F can be used to turn on or turn off usage of purchase or other transaction data 120 by the security application 110 and/or the security service 112. As explained above, the security application 110 and/or the security service 112 can be configured to track transactions occurring at the user device 102 and/or transactions associated with a user of the user device 102. Users or other entities may wish to disable this capability to address privacy concerns and/or for other reasons. Thus, selection of the UI control 406F can cause the user device 102 to activate and/or deactivate usage of purchase data and/or other transaction data 120 by the security application 110 and/or the security service 112. It should be understood that this example is illustrative and therefore should not be construed as being limiting in any way.

The event descriptor 404G can be used to turn on or turn off automatic updating of passwords, event data 116, and/or challenge/responses by the security application 110 and/or the security service 112. As explained above, the security application 110 and/or the security service 112 can be configured to periodically update the event data 116 to attempt to ensure that the event data 116 stored at the user device 102 and/or the data store 128 is associated with recent activity. Some embodiments of the concepts and technologies described herein provide for frequently updating the event data 116 because users or other entities may more easily remember recent transactions and/or details associated with recent transactions than with comparatively older transactions. Users or other entities may wish to disable this capability to enhance battery life of the user device 102, to reduce data usage and/or transfers, to address security or privacy concerns, and/or for other reasons. Thus, selection of the UI control 406G can cause the user device 102 to activate and/or deactivate usage of various long and/or short range transmitters, receivers, or transceivers by the security application 110 and/or the security service 112. It should be understood that this example is illustrative and therefore should not be construed as being limiting in any way.

In the illustrated embodiment, selection of the UI control 406G and/or activation of the option to update passwords and/or other authentication information automatically can cause the user device 102 to present an option 408 for configuring a frequency with which the event data 116 is to be updated. The option 408 can be presented with a drop-down box 410 or other UI control for setting a frequency of event data 116 updates. While an option for daily updates is illustrated as being displayed in the drop-down box 410, other options are contemplated such as monthly, weekly, hourly, each time an event occurs, manually, and/or other frequencies. It should be understood that this example is illustrative and therefore should not be construed as being limiting in any way.

The event-based security options screen 402 also can display a UI control 412 for indicating that configuration of the security application 110 is complete and a UI control 414 for indicating that a user or other entity want to exit the configuration screen without saving any changes made. Because other UI controls can be displayed in addition to, or instead of the illustrated examples, it should be understood that this example is illustrative and therefore should not be construed as being limiting in any way. It can be appreciated that selection of the UI control 412 can cause the user device 102 to transmit one or more preferences to the security service 112, if desired, and/or to store the preferences for use by the security application 110. These preferences can be used, for example, in execution of the operation 206 of the method 200 as described above with reference to FIG. 2. It should be understood that this example is illustrative and therefore should not be construed as being limiting in any way.

Referring now to FIG. 4B, a UI diagram showing additional aspects of the concepts and technologies disclosed herein for configuring and/or providing event-based security challenges is described in detail. In particular, FIG. 4B shows an illustrative screen display 400B generated by a device such as the user device 102. It should be appreciated that the UI diagram illustrated in FIG. 4B is illustrative of one contemplated example of a UI and therefore should not be construed as being limiting in any way. As shown in FIG. 4B, the screen display 400B can be presented on a mobile computing device such as a smartphone, if desired. It should be understood that this example is illustrative, and should not be construed as being limiting in any way.

The screen display 400B can be displayed by the user device 102, for example, in response to selection of an option to configure security-based challenges. In the illustrated embodiment, the screen display 400B includes a security service preferences display screen 420 via which a user or other entity can configure options, preferences, and/or settings associated with the security application 110 and/or the security service 112. It should be understood that the illustrated embodiment is illustrative of one contemplated security service preferences display screen 420 and therefore should not be construed as being limiting in any way.

The security service preferences display screen 420 can include a number of menus, submenus, and/or options. Some example options are described herein but should not be construed as being limiting in any way. The illustrated security service preferences display screen 420 includes a location events menu 422 for enabling and/or disabling the use of location events and/or location data 118 by the security application 110 and/or the security service 112. The location events menu 422 can be interacted with by a user or other entity to enable or disable the use of location information when configuring challenges 136 and/or responses 138.

The location events menu 422 also can include a submenu or option for configuring a scope of challenges 136 and/or responses 138 generated based upon location events. In the illustrated embodiment, the option for configuring the scope of the challenges 136 and/or the responses 138 can include options for defining the scope as street address, an intersection, a city block, a ZIP code, a neighborhood, a city, town, or township, a county, a state, a region, a country, or the like. Thus, a user or other entity can enable or disable usage of location data in generating challenges 136 and/or response 138, and configure a scope of such challenges 136 and/or responses 138. It should be understood that this example is illustrative and therefore should not be construed as being limiting in any way.

The security service preferences display screen 420 can include a track transactions menu 424 for enabling and/or disabling the use of transaction events and/or transaction data 120 by the security application 110 and/or the security service 112. The track transactions menu 424 can be interacted with by a user or other entity to enable or disable the use of transaction information when configuring challenges 136 and/or responses 138. The track transactions menu 424 also can include one or more submenus or options for configuring a scope of challenges 136 and/or responses 138 generated based upon transaction events.

In the illustrated embodiment, the track transactions menu 424 includes an option for defining a time span for which transaction data may be used and an option for defining a dollar amount or other transaction size. Thus, a user or other entity can enable or disable usage of transaction data 120 in generating challenges 136 and/or response 138, and configure a scope of such challenges 136 and/or responses 138 by defining a time range for transactions (e.g., the past one day, the past one week, etc.) and/or a scope of the transactions (e.g., transactions less than a dollar amount, more than a dollar amount, or the like), thereby configuring the challenges 136 and/or responses 138 based upon the user's memory and/or preferences. It should be understood that this example is illustrative and therefore should not be construed as being limiting in any way.

The security service preferences display screen 420 can include a track local users menu 426 for enabling and/or disabling the use of local user events and/or local device data 124 by the security application 110 and/or the security service 112. The track local users menu 426 can be interacted with by a user or other entity to enable or disable the use of local device data 124 and/or the identification of local devices, systems, or users when configuring challenges 136 and/or responses 138. The track transactions menu 424 also can include one or more submenus or options for configuring a scope of challenges 136 and/or responses 138 generated based upon transaction events, though these submenus and/or options are not illustrated in FIG. 4B.

The security service preferences display screen 420 can include a track call events menu 428 for enabling and/or disabling the use of call events and/or call data 122 by the security application 110 and/or the security service 112. The track call events menu 428 can be interacted with by a user or other entity to enable or disable the use of call information when configuring challenges 136 and/or responses 138. The track call events menu 428 also can include one or more submenus or options for configuring a scope of challenges 136 and/or responses 138 generated based upon call events.

In the illustrated embodiment, the track call events menu 428 includes an option or submenu for defining a time span for which call events and/or call data 122 may be used. Thus, a user or other entity can enable or disable usage of call events and/or call data 122 in generating challenges 136 and/or response 138, and configure a scope of such challenges 136 and/or responses 138 by defining a time range for call events to be used. It should be understood that this example is illustrative and therefore should not be construed as being limiting in any way.

The security service preferences display screen 420 can include a track data events menu 430 for enabling and/or disabling the use of data events by the security application 110 and/or the security service 112. The track data events menu 430 can be interacted with by a user or other entity to enable or disable the use of data transfer information when configuring challenges 136 and/or responses 138. The track data events menu 430 also can include one or more submenus or options for configuring a scope of challenges 136 and/or responses 138 generated based upon data events. In the illustrated embodiment, the track data events menu 430 includes an option or submenu for defining a time span for which data events may be used. Thus, a user or other entity can enable or disable usage of data events in generating challenges 136 and/or response 138, and configure a scope of such challenges 136 and/or responses 138 by defining a time range for data events to be used. It should be understood that this example is illustrative and therefore should not be construed as being limiting in any way.

The security service preferences display screen 420 can include a track social networking ("SN") events menu 432 for enabling and/or disabling the use of social networking events by the security application 110 and/or the security service 112. The track social networking events menu 432 can be interacted with by a user or other entity to enable or disable the use of social networking events when configuring challenges 136 and/or responses 138. The track social networking events menu 432 also can include one or more submenus or options for configuring a scope of challenges 136 and/or responses 138 generated based upon social networking events, though these submenus and/or options are not illustrated in FIG. 4B. In some embodiments, the social networking events can include posts, picture uploads, audio uploads, tweets, messages, or the like. Because social networking events sometimes are publicly available, users or other entities may wish to disable the use of social networking events in preparing challenges 136 and/or responses 138. It should be understood that this example is illustrative and therefore should not be construed as being limiting in any way.

With reference to FIG. 4C, a UI diagram showing additional aspects of the concepts and technologies disclosed herein for providing an event-based security challenge are described in detail. In particular, FIG. 4C shows an illustrative screen display 400C generated by a device such as the user device 102. It should be appreciated that the UI diagram illustrated in FIG. 4C is illustrative of one contemplated example of a UI that can be generated by the user device 102 and therefore should not be construed as being limiting in any way. As shown in FIG. 4C, the screen display 400C can be presented on a mobile computing device such as a smartphone, if desired. It should be understood that this example is illustrative, and should not be construed as being limiting in any way.

The screen display 400C can include a webpage, an application display, or other display ("display") 440. The display 440 is illustrated as showing a webpage that may be accessed by the user device 102. It should be understood that this example is illustrative and therefore should not be construed as being limiting in any way. In the illustrated embodiment, the display 440 can correspond to a screen for ordering and/or completing a financial transaction. Although not visible in FIG. 4C, the display 440 may include an option to authenticate with the resource 130 that provides the data used to render the display 440. In response to entering the field and/or selecting the option to authenticate with the resource 130, the user device 102 can be configured to display the event-based challenge screen 442 shown in FIG. 4C.

A variety of event-based challenges have been described herein, and as such, the illustrated embodiment should be understood as being illustrative of one embodiment. In the illustrated embodiment, the event-based challenge screen 442 requests that the user identify a last song purchased through a media service such as the ITUNES family of media service products from Apple Corporation in Cupertino, Calif. In response to the challenge 136, the user or other entity as entered a name of a song the user believes corresponds to the last-purchased song. Upon transmitting the response 138 to the resource 130, the resource 130 can determine if the response 138 matches the expected response based upon the challenge/response data 134 and enable or disable access to the resource 130 based upon this determination. Thus, a user or other entity may authenticate with the resource 130 without having to remember and/or store a password or other authentication information. Rather, the user or other entity can use information that may be readily available to the user to access the resource 130. It should be understood that this example is illustrative and therefore should not be construed as being limiting in any way.

Figure 5:
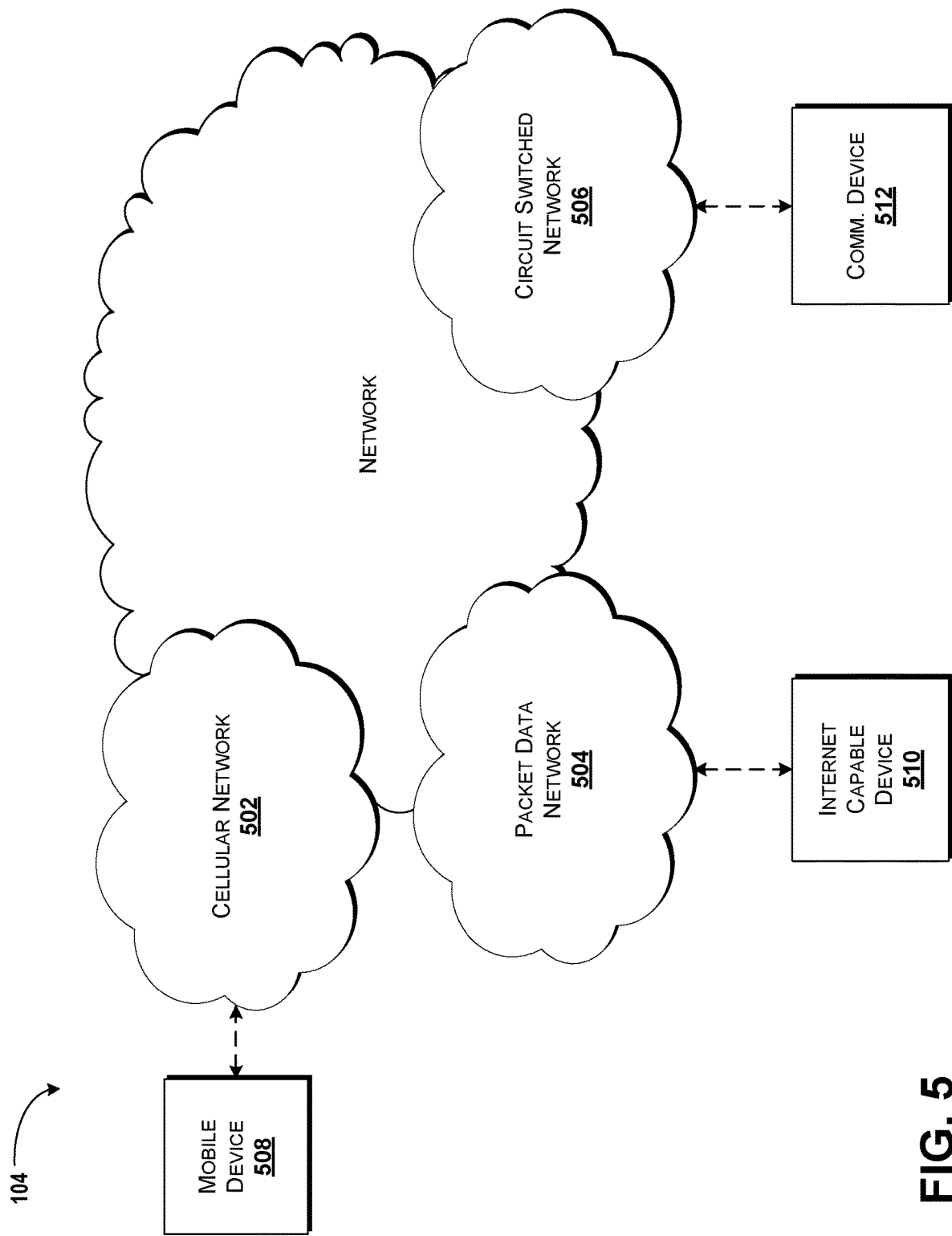
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G and 5G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
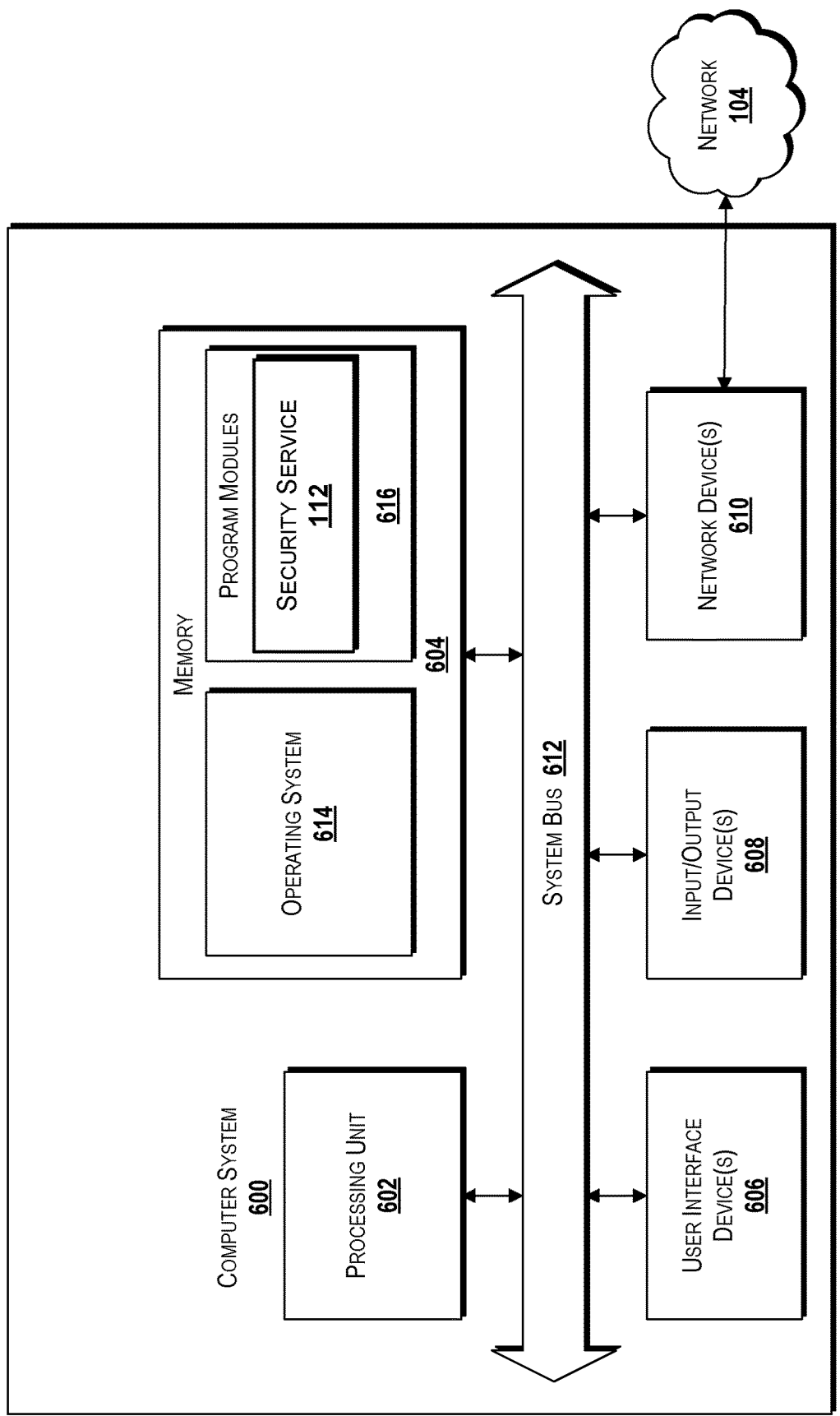
FIG. 6 is a block diagram illustrating an example computer system configured to provide event-based security challenges, according to some illustrative embodiments.

FIG. 6 is a block diagram illustrating a computer system 600 configured to provide the functionality described herein for providing event-based security challenges, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the security service 112. This and/or other programs can be embodied in computer-readable media containing instructions that, when executed by the processing unit 602, perform one or more of the methods 200, 300 described in detail above with respect to FIGS. 2-3. According to some embodiments, the program modules 616 may be embodied in hardware, software, firmware, or any combination thereof. Although not shown in FIG. 6, it should be understood that the memory 604 also can be configured to store the event data 116, the challenge/response data 134, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media as defined herein.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or IR transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
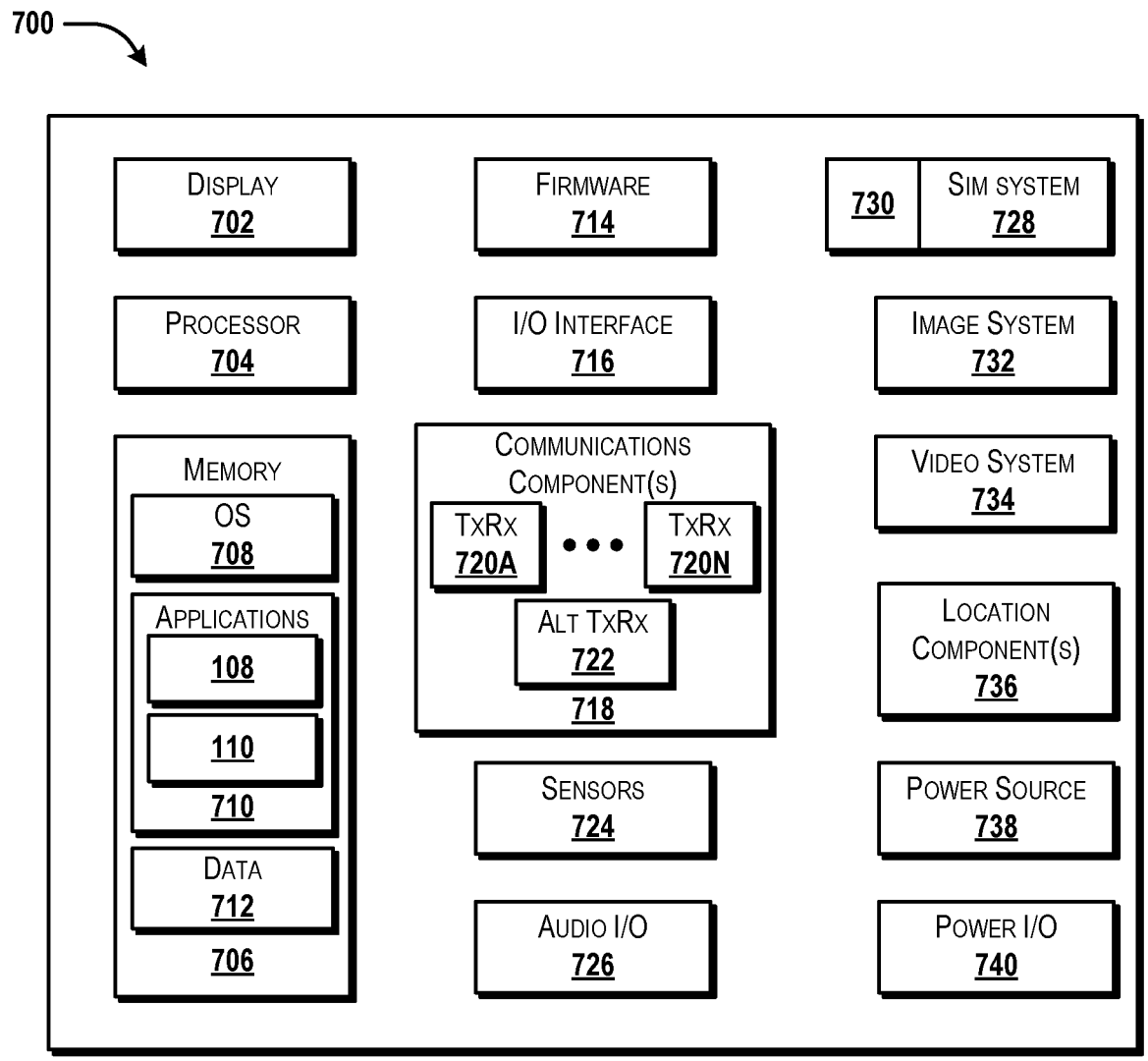
FIG. 7 is a block diagram illustrating an example mobile device configured to interact with a security service, according to some illustrative embodiments.

Turning now to FIG. 7, an illustrative mobile device 700 and components thereof will be described. In some embodiments, the user device 102 described above with reference to FIG. 1 can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display asset information, asset tag or asset ID information, asset management account information, various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the application programs 108, the security application 110, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, scanning or capturing asset ID or asset tag information, creating new asset tags or asset ID numbers, viewing asset information and/or account information, answering/initiating calls, entering/deleting data, entering and setting user IDs and passwords or other authentication information for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, asset information, asset tags and/or asset identifiers, and/or other applications or program modules.

According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, asset information, user information, organization information, presence status information, user IDs, passwords, other authentication information, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSDPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), NFC, other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from GPS devices, A-GPS devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for providing event-based security challenges have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   storing, by a first computing device comprising a processor, event data that relates to an event associated with a user of a user device, wherein the event data is generated by the user device, and wherein the event data is obtained by the first computing device from the user device;
   detecting, by the first computing device, a request, by the user device, for a resource;
   determining, by the first computing device and based on a setting associated with the user and based on a resource type associated with the resource being requested by the user device, a difficulty level to be required for a response to a challenge question, wherein the difficulty level comprises a degree of accuracy;
   generating, by the first computing device, the challenge question based on the event data and the difficulty level;
   generating, by the first computing device, the response based on the event data and the difficulty level, the response comprising a valid response to the challenge question; and
   providing, by the first computing device and to a second computing device that hosts the resource, the challenge question and the response, wherein the second computing device is configured to authenticate the user associated with the user device using the challenge question and the response.

2. The method of claim 1, wherein the resource comprises a website.

3. The method of claim 1, wherein the event comprises a transaction.

4. The method of claim 1, wherein the challenge question and the response are based on an identity of a device that was in a proximity of the user device.

5. The method of claim 1, wherein the challenge question and the response relate to a time at which the user device was near an automobile.

6. The method of claim 1, wherein the challenge question and the response are based on a data download.

7. The method of claim 1, wherein the event data is obtained from another user device that is associated with the user.

8. A system comprising:
   a first computing device comprising a processor; and
   a memory that stores computer-executable instructions that, when executed by the processor, cause the processor to perform operations comprising
      storing, by the first computing device, event data that relates to an event associated with a user of a user device, wherein the event data is generated by the user device, and wherein the event data is obtained by the first computing device from the user device,
      detecting, by the first computing device, a request, by the user device, for a resource,
      determining, by the first computing device and based on a setting associated with the user and based on a resource type associated with the resource being requested by the user device, a difficulty level to be required for a response to a challenge question, wherein the difficulty level comprises a degree of accuracy,
      generating, by the first computing device, the challenge question based on the event data and the difficulty level,
      generating, by the first computing device, the response based on the event data and the difficulty level, the response comprising a valid response to the challenge question, and
      providing, by the first computing device and to a second computing device that hosts the resource, the challenge question and the response, wherein the second computing device is configured to authenticate the user associated with the user device using the challenge question and the response.

9. The system of claim 8, wherein the resource comprises a website.

10. The system of claim 8, wherein the event comprises a transaction.

11. The system of claim 8, wherein the challenge question and the response are based on an identity of a device that was in a proximity of the user device.

12. The system of claim 8, wherein the challenge question and the response are based on a data download.

13. The system of claim 8, wherein the event data is obtained from another user device that is associated with the user.

14. A computer storage medium having computer-executable instructions stored thereon that, when executed by a processor, cause the processor to perform operations comprising:
   storing, by a first computing device, event data that relates to an event associated with a user of a user device, wherein the event data is generated by the user device, and wherein the event data is obtained by the first computing device from the user device;
   detecting, by the first computing device, a request, by the user device, for a resource;
   determining, by the first computing device and based on a setting associated with the user and based on a resource type associated with the resource being requested by the user device, a difficulty level to be required for a response to a challenge question, wherein the difficulty level comprises a degree of accuracy;
   generating, by the first computing device, the challenge question based on the event data and the difficulty level;
   generating, by the first computing device, the response based on the event data and the difficulty level, the response comprising a valid response to the challenge question; and
   providing, by the first computing device and to a second computing device that hosts the resource, the challenge question and the response, wherein the second computing device is configured to authenticate the user associated with the user device using the challenge question and the response.

15. The computer storage medium of claim 14, wherein the resource comprises a website.

16. The computer storage medium of claim 14, wherein the event comprises a transaction.

17. The computer storage medium of claim 14, wherein the challenge question and the response are based on an identity of a device that was in a proximity of the user device.

18. The computer storage medium of claim 14, wherein the challenge question and the response are based on a data download.

19. The computer storage medium of claim 14, wherein the event data is obtained from another user device that is associated with the user.

20. The computer storage medium of claim 14, wherein the event comprises a purchase.

* * * * *